(12) United States Patent
Al Ghossein et al.

(10) Patent No.: US 10,649,169 B2
(45) Date of Patent: May 12, 2020

(54) SLIDING JAW DROP CLAMP

(71) Applicant: Hubbell Incorporated, Shelton, CT (US)

(72) Inventors: Rabih M. Al Ghossein, Hoover, AL (US); Adrian Beau Candelaria, Alabaster, AL (US); Seydou Diop, Birmingham, AL (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/055,440

(22) Filed: Aug. 6, 2018

(65) Prior Publication Data

US 2019/0056561 A1 Feb. 21, 2019

Related U.S. Application Data

(60) Provisional application No. 62/546,190, filed on Aug. 16, 2017.

(51) Int. Cl.
| | |
|---|---|
| *G02B 6/44* | (2006.01) |
| *H02G 7/08* | (2006.01) |
| *F16L 3/10* | (2006.01) |
| *G02B 6/48* | (2006.01) |
| *B60M 1/23* | (2006.01) |

(52) U.S. Cl.
CPC ............. *G02B 6/4471* (2013.01); *B60M 1/23* (2013.01); *F16L 3/1033* (2013.01); *G02B 6/483* (2013.01); *H02G 7/08* (2013.01)

(58) Field of Classification Search
CPC ....... G02B 6/4471; B60M 1/23; F16L 3/1033; H02G 7/08
See application file for complete search history.

(56) References Cited

U.S. PATENT DOCUMENTS

| | | | |
|---|---|---|---|
| 1,489,835 | A | 4/1924 | Kietz |
| 1,603,035 | A | 10/1926 | Evans |

(Continued)

FOREIGN PATENT DOCUMENTS

| | | |
|---|---|---|
| JP | 08308071 | 11/1996 |
| JP | 10042438 | 2/1998 |
| JP | 2001136643 | 5/2001 |

OTHER PUBLICATIONS

Burndy Fastap Installation Instructions 2014.

(Continued)

*Primary Examiner* — Daniel Petkovsek
(74) *Attorney, Agent, or Firm* — Wissing Miller LLP

(57) ABSTRACT

A cable clamp for clamping drop cables to main span cables. The cable clamp has a frame, a jaw assembly and a stem. The frame has a main body, a drop cable body and a main cable body. The jaw assembly is operatively coupled to the main body and has a drop cable jaw and a main cable jaw. The drop cable jaw is movable along the main body between an open position and a closed position. The main cable jaw is movable along the main body between an open position and a closed position. The main cable jaw can be automatically moved from the open position to the closed position. The stem is operatively coupled to the main body and the jaw assembly so that the stem can selectively block the main cable jaw in the open position and release the main cable jaw so that can automatically move to the closed position.

20 Claims, 11 Drawing Sheets

(56) References Cited

U.S. PATENT DOCUMENTS

| | | |
|---|---|---|
| 2,120,447 A | 3/1935 | Tipsord |
| 2,107,061 A | 1/1937 | Pittman et al. |
| 2,151,524 A | 3/1939 | Pittman et al. |
| 2,206,653 A | 10/1939 | Yonkers |
| 2,397,390 A | 3/1946 | Wadsworth |
| 2,530,299 A | 7/1947 | Hendley |
| 2,574,796 A | 11/1951 | Moore |
| 2,651,766 A | 9/1953 | Runde |
| 2,811,703 A | 10/1957 | Becker |
| 2,867,787 A | 3/1958 | Nilsson |
| 3,036,286 A | 3/1960 | Gorc et al. |
| 2,958,067 A | 10/1960 | Hardy |
| 3,075,166 A | 1/1963 | Peek |
| 3,132,914 A | 5/1964 | Wengen |
| 3,142,525 A | 7/1964 | Roosman |
| 3,177,459 A | 4/1965 | Toedtman |
| 3,431,538 A | 3/1969 | Hubbard |
| 3,614,700 A | 10/1971 | Beard et al. |
| 3,830,427 A | 8/1974 | Polidori |
| 3,923,363 A | 12/1975 | Kraft |
| 4,183,686 A | 1/1980 | De France |
| 4,293,176 A | 10/1981 | Linklof |
| 4,600,264 A | 7/1986 | Counsel |
| 4,707,051 A | 11/1987 | Hall |
| 4,846,725 A | 7/1989 | Williams et al. |
| 5,004,437 A | 4/1991 | Walter et al. |
| 5,021,014 A | 6/1991 | Walter et al. |
| D329,244 S | 9/1992 | Saito et al. |
| 5,369,849 A | 12/1994 | De France |
| 5,440,665 A | 8/1995 | Ray |
| 5,539,961 A | 7/1996 | DeFrance |
| 5,547,404 A | 8/1996 | Nellis, Jr. et al. |
| 5,692,930 A * | 12/1997 | Garver ............ H01R 4/44 439/781 |
| 6,371,419 B1 | 4/2002 | Ohnuki |
| 6,390,861 B1 | 5/2002 | DeFrance |
| 6,595,472 B1 * | 7/2003 | Pisczak ............ G02B 6/483 248/74.1 |
| 6,726,166 B2 * | 4/2004 | Goodman ............ E21B 17/1035 248/229.14 |
| 6,732,981 B2 | 5/2004 | Franks |
| 7,029,316 B2 | 4/2006 | Jackson, III |
| 7,160,142 B2 | 1/2007 | Hughes et al. |
| 7,666,024 B2 | 2/2010 | De France |
| 8,272,904 B2 * | 9/2012 | Copper ............ H01R 4/5091 439/781 |
| 8,512,070 B2 | 8/2013 | De France |
| 8,672,716 B2 | 3/2014 | DeFrance |
| 9,201,205 B2 * | 12/2015 | Bunte ............ G02B 6/44 |
| 9,577,351 B2 | 2/2017 | Martin |
| 10,095,001 B2 | 10/2018 | Sakmar |
| 2002/0142674 A1 | 10/2002 | Chadbourne et al. |
| 2013/0303035 A1 | 11/2013 | Neal et al. |
| 2016/0294074 A1 | 10/2016 | De France et al. |
| 2018/0031794 A1 | 2/2018 | Sakmar |
| 2018/0031795 A1 | 2/2018 | Al Ghossein |
| 2019/0121035 A1 * | 4/2019 | Al Ghossein ........ G02B 6/3887 |

OTHER PUBLICATIONS

Hubbell Brochure "Overhead Primary Taps Hot Line Tap Clamps Aluminum", Dec. 2014 (32 pages).
Fargo Brochure "GH-700A", Jan. 1995 (2 pages).
Burndy Fastap Introduction Sheet 2014.

* cited by examiner

SLIDING JAW DROP CLAMP

CROSS REFERENCE TO RELATED APPLICATIONS

The present disclosure is based on and claims benefit from U.S. Provisional Patent Application Ser. No. 62/546,190, filed Aug. 16, 2017 entitled "Sliding Jaw Drop Clamp" the entire contents of which are incorporated herein by reference.

BACKGROUND

Field

The present disclosure relates generally to clamps for utility cabling and more particularly to cable clamps for clamping drop cables to main span cables.

Description of the Related Art

Aerial cabling, such as fiber optic cabling, is typically strung from utility pole to utility pole, or from a utility pole to a building. The cabling between utility poles is often referred to as a main span. To withstand cable sag and environmental conditions, two types of fiber optic cables are available to string from pole-to-pole or from pole-to-building: lashed fiber optic cables or self-supporting fiber optic cables. Lashed fiber optic cable uses a galvanized steel support wire to which the fiber optic cable is affixed or lashed. Self-supporting fiber optic cable typically includes a strength member in the form of a messenger section supporting the fiber optic cable, and a carrier section that includes optical fibers, or optical fibers and electrical conductors. An example of self-supporting fiber op cable is RPX cable manufactured by Corning Cable Systems.

With aerial fiber optic cabling, connections between fiber cables are typically made in close proximity to the utility pole or building. However, there are instances where drop connections are needed. Drops are cable connections between a main span and a drop cable at a point along the main span. Drops for fiber optic cabling are used when, for example, smaller quantities of fibers are needed to feed a terminal. The smaller quantities of fibers are in a drop cable and run to a terminal located at a utility pole or building.

Drops are achieved on lashed aerial cable using a bolted cable clamp with a hook. The cable clamp is bolted to the galvanized steel support wire that the fiber optic cable is lashed to, and then a dead-end is attached to the hook to hold the drop. In instances where a bucket truck can be used, a technician would bolt the cable clamp to the galvanized steel support wire while standing in the bucket. In instances where a bucket truck cannot be used, a technician would lean a ladder against the galvanized steel support wire in order to bolt the cable clamp to the galvanized steel support wire.

However, such bolted cable clamps are not suitable for self-supporting fiber optic cable as they do not use a galvanized steel support wire. In addition, self-supporting fiber optic cables do not allow for the support of a ladder leaning against it. As a result, in instances where a bucket truck cannot be used, the clamp has to be installed from the ground using extendable reach tools, e.g., a hot stick. Typical bolted type cable clamps are not suitable for such ground-based installations. Accordingly, a cable clamp capable of clamping a drop cable to a main span cable is needed. The present disclosure provides a cable clamp that can be used with self-supporting or lashed fiber optic cables for drops where the cable clamp is to be installed from the ground.

SUMMARY

The present disclosure provides embodiments of cable clamps for clamping drop cables to main span cables. In one exemplary embodiment, the cable clamp has a frame, a jaw assembly and a stem. The frame has a main body, a drop cable body and a main cable body. The jaw assembly is operatively coupled to the main body. The jaw assembly has a drop cable jaw and a main cable jaw. The drop cable jaw is movable along the main body between an open position permitting a drop cable to be positioned between the drop cable jaw and the drop cable body and a closed position where the drop cable jaw applies a force against the drop cable clamping the drop cable to the drop cable body. The main cable jaw is movable along the main body between an open position permitting a main cable to be positioned between the main cable jaw and the main cable body and a closed position where the main cable jaw applies a force against the main cable clamping the main cable to the main cable body. Preferably, the main cable jaw can be automatically moved from the open position to the closed position. The stem is operatively coupled to the main body and to the jaw assembly such that the stem can selectively block the main cable jaw in the open position and release the main cable jaw so that automatically moves to the closed position. In this exemplary embodiment, the jaw assembly also includes a slider and a spring. The slider is coupled to the main cable jaw and has a spring stop extending into a channel of the main body. The spring is positioned in the channel between a channel wall and the spring stop and normally biases the main cable jaw toward the main cable jaw closed position. In an exemplary embodiment, the drop cable jaw has a cable contacting surface that can contact the drop cable when the drop cable jaw is in the closed position. In addition, the drop cable body can include a central portion associated with the main body, a first extension portion extending from one end of the central portion and a second extension portion extending from another end of the central portion. The drop cable central portion has a cable contacting surface that can also contact the drop cable when the drop cable jaw is in the closed position. In an exemplary embodiment, the main cable jaw has a cable contacting surface that can contact the main cable when the main cable jaw is in the closed position. In addition, the main cable body can include a central portion associated with the main body, a first extension portion extending from one end of the central portion and a second extension portion extending from another end of the central portion. The main cable central portion has a cable contacting surface that can also contact the main cable when the main cable jaw is in the closed position.

In another exemplary embodiment, the cable clamp has a frame, a jaw assembly and a stem. The frame includes a main body, a drop cable body and a main cable body. The main body includes a first end wall, a second end wall, a drop cable side wall, a main cable side wall, a top wall and a bottom wall. The main body has an aperture extending from the top wall to the bottom wall and a channel extending through the top wall from the first end wall through the aperture and ending in a channel wall. The main body also has a first track extending at an angle through the top wall from the second end wall toward the first end wall and the drop cable side wall, and a second track extending at an angle through the top wall from the second end wall toward the first end wall and the main cable side wall.

The drop cable body is associated with the drop cable side wall and has a central portion, a first extension portion extending from one end of the central portion and a second extension portion extending from another end of the central portion. The central portion of the drop cable body has a cable contacting surface. The main cable body is associated with the main cable side wall and has a central portion, a first extension portion extending from one end of the central portion and a second extension portion extending from another end of the central portion. The central portion of the main cable body has a cable contacting surface.

In this exemplary embodiment, the jaw assembly is operatively coupled to the main body and includes a drop cable jaw, a main cable jaw, a slider and a spring. The drop cable jaw is operatively coupled with the first track in the main body and is movable between an open position and a closed position. The main cable jaw is operatively coupled with the second track in the main body and is movable between an open position and a closed position. The slider is positioned adjacent the top wall of the main body and is coupled to the main cable jaw. The slider has a spring stop that extends into the channel of the main body. The spring is positioned in the channel between the channel wall and the spring stop. The spring normally biases the main cable jaw toward the closed position.

In this exemplary embodiment, the stem extends through the aperture in the main body and is movable between a position blocking the slider stop and a position releasing the slider stop.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Exemplary embodiments of the cable clamp of the present disclosure are shown. For ease of description, the cable clamp described herein may also be referenced as the "clamp." The clamp according to the present disclosure is configured to be installed from the ground with an extendable reach tool, such as a hot stick. A jaw secures a drop cable in a drop cable body of a drop cable frame of the clamp, and an automatic jaw secures a main span cable into a main span cable body of a frame of the clamp. For ease of description, the "main span cable" may also be referred to herein as the "main cable."

Figure 1:
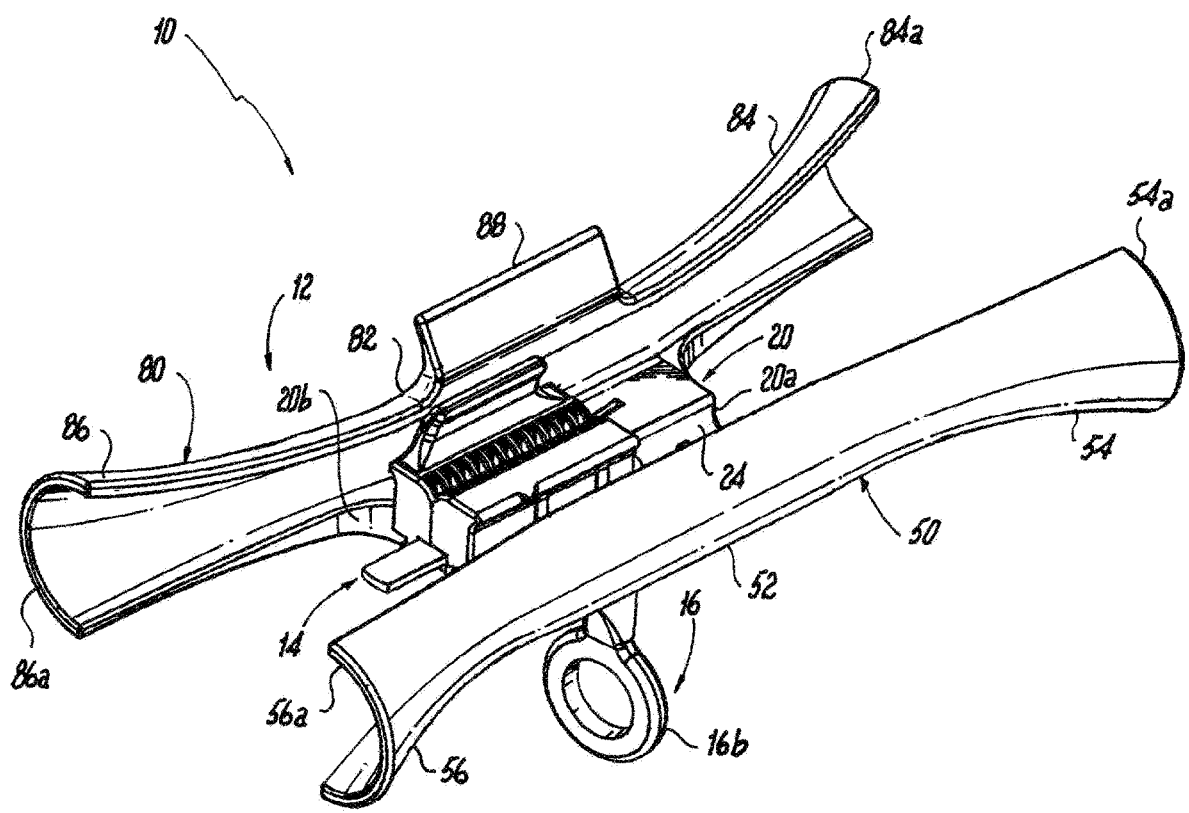
FIG. 1 is a top perspective view of an exemplary embodiment of a cable clamp according to the present disclosure, illustrating a frame, a jaw assembly and a stem of the cable clamp.
Figure 2:
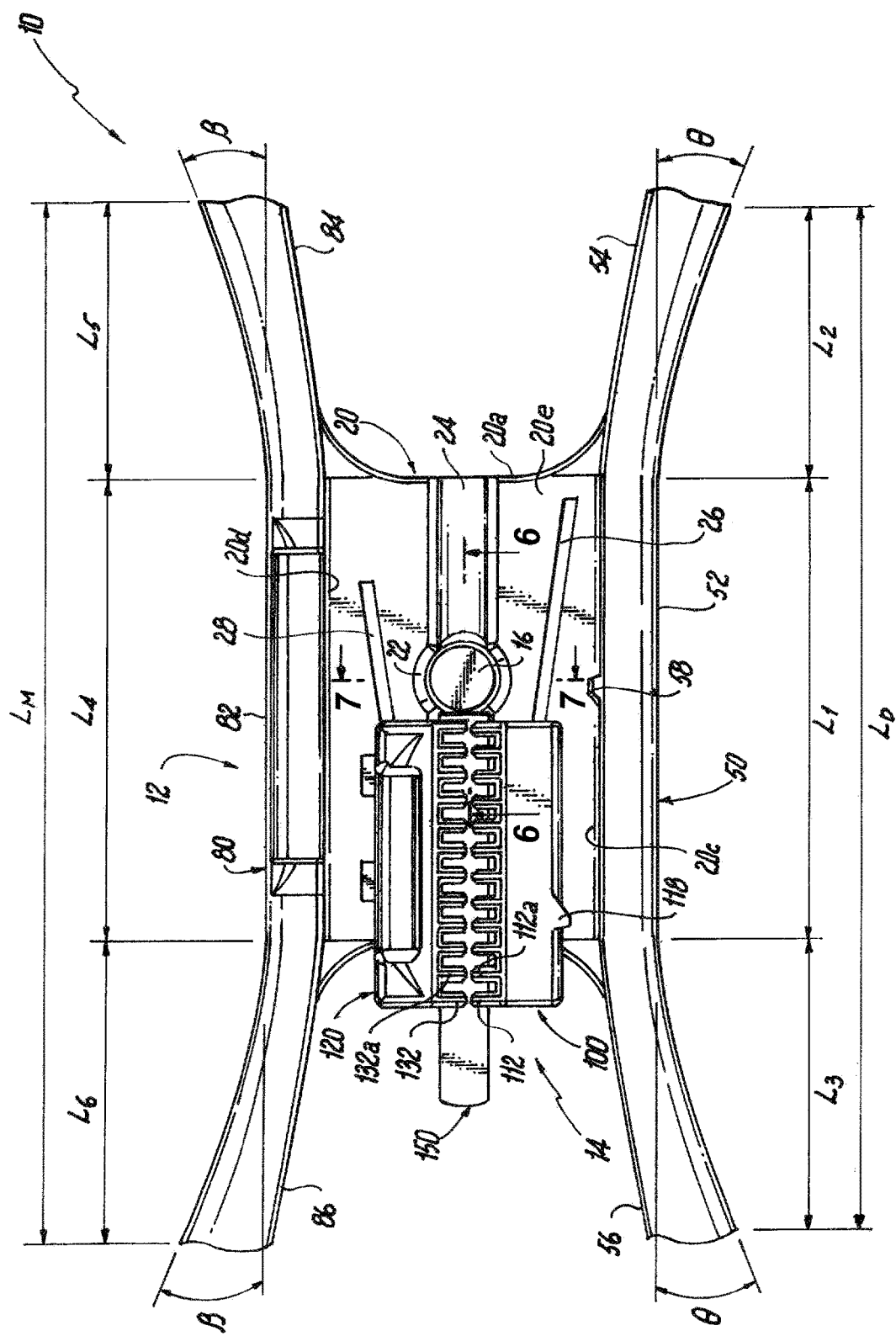
FIG. 2 is a top plan view of the cable clamp of FIG. 1, illustrating a main body, a drop cable body and a main cable body of the frame of the cable clamp.
Figure 3:
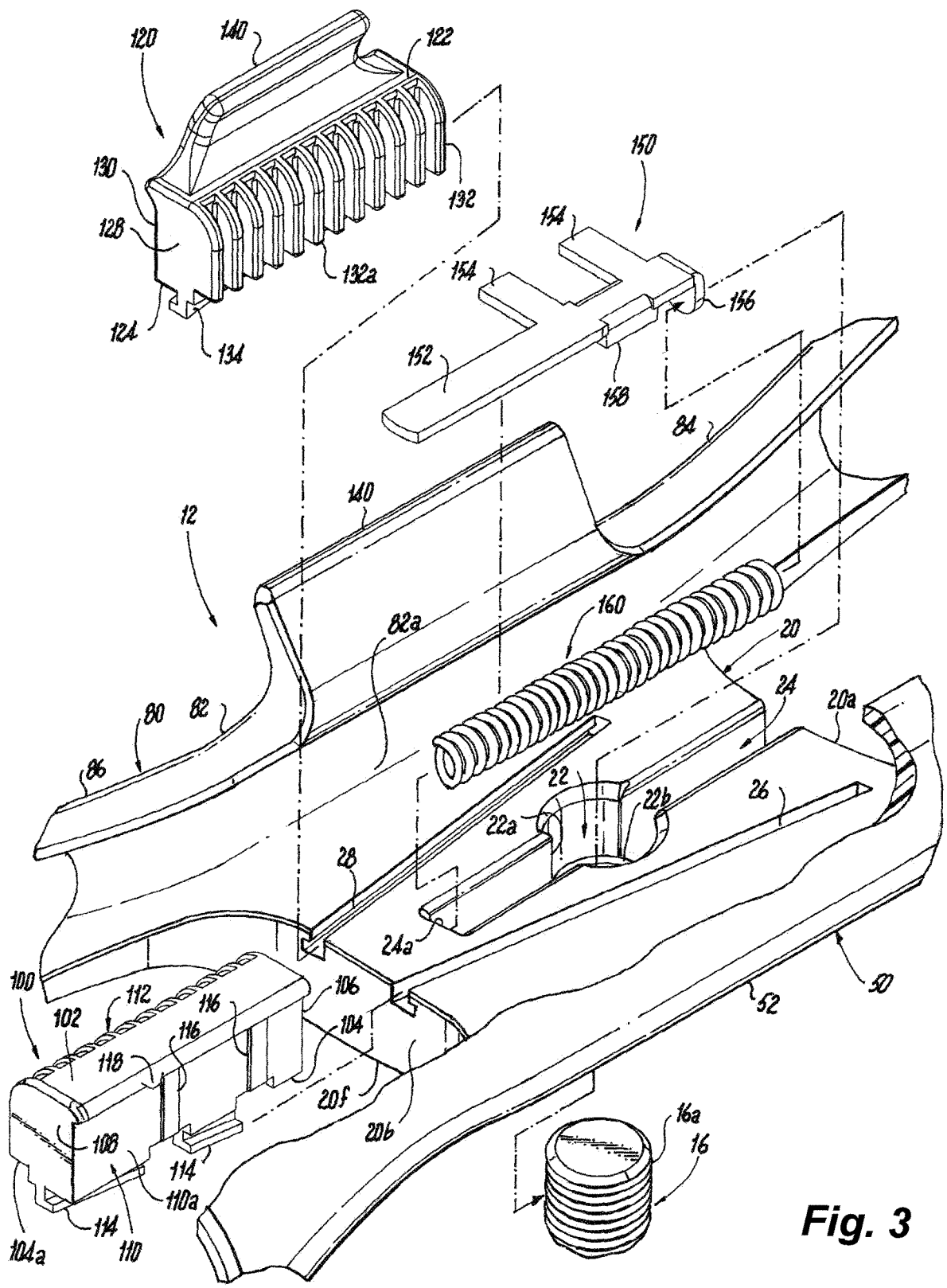
FIG. 3 is an exploded view of a portion of the cable clamp of FIG. 1, illustrating components of the jaw assembly of the cable clamp.

Referring now to the figures, in particular FIGS. 1-3, an exemplary embodiment of the clamp according to the present disclosure is shown. The clamp 10 includes a frame 12, a jaw assembly 14 and a stem 16. The stem 16 is preferably an eye-stem that has a threaded end 16a that couples to the frame 12, and an eye 16b for coupling the clamp 10 with an extendable reach tool, such as for example a hot stick. The frame 12, jaw assembly 14 and stem 16 may be made of a metallic material, such as aluminum, cast aluminum, galvanized steel or stainless steel, or a combination of metallic materials. In another exemplary embodiment, the frame 12, jaw assembly 14 and stem 16 may be made of a non-metallic material, such as a rigid plastic or composite materials e.g., carbon fiber. In another exemplary embodiment, the frame 12, jaw assembly 14 and stem 16 may be made of a combination of a metallic material and/or a non-metallic material.

The frame 12 includes a main body 20, a drop cable body 50 and a main cable body 80. The frame 12 may be formed as a unitary structure or as separate components secured together with fasteners, such as mechanical fasteners or adhesive fasteners. The main body 20 of the frame 12 has a first end wall 20a, a second end wall 20b, a drop cable side wall 20c, a main cable side wall 20d, a top wall 20e and a bottom wall 20f. The main body 20 may be a solid structure, a hollow structure, a partially hollow structure or a hollow structure with one or more interior braces extending between the side walls 20c and 20d and/or end walls 20a and 20b. The main body 20 of the frame 12 also includes an aperture 22 generally in a central region of the main body as shown in FIGS. 2 and 3. The aperture 22 is configured to receive the stem 16. In the embodiment shown, an upper portion 22a of the aperture 22 is smooth with a top of the aperture 22 chamfered, and a lower portion 22b of the aperture 22, seen in FIGS. 3 and 6, is threaded to receive the threaded end 16a of the stem 16. Within the main body 20 of the frame 12 and extending from the first end wall 20a toward the second end wall 20b and passing through the aperture 22 and ending at channel wall 24a is a spring channel 24 used to house a spring of the jaw assembly 14 as described below. Within the main body 20 of the frame 12 and extending from the second end wall 20b toward the drop cable side wall 20c and toward the first end wall 20a is a first jaw track 26 so that the track is at an angle as shown. The first jaw track 26 is configured to receive a portion of a drop cable jaw 100, seen in FIG. 8, of the jaw assembly 14 so that the drop cable jaw 100 can slide along the first jaw track 26 between open and closed positions. In the exemplary embodiment shown, the first jaw track 26 is an L-shaped track, seen in FIG. 3, that receives an L-shaped rail on the drop cable jaw 100 as described below. Within the main body 20 of the frame 12 and extending from the second end wall 20b toward the main cable side wall 20d and toward the first end wall 20a is a second jaw track 28 so that the track is at an angle as shown. The second jaw track 28 is configured to receive a portion of a main cable jaw 120 of the jaw assembly 14 so that the main cable jaw 120 can slide along the second jaw track 28 between open and closed positions. In the exemplary embodiment shown, the second jaw track 28 is an L-shaped track, seen in FIG. 3, that receives L-shaped rails 134 on the main cable jaw 120, seen in FIGS. 4 and 5, of the jaw assembly 14, as described below.

Figure 16:
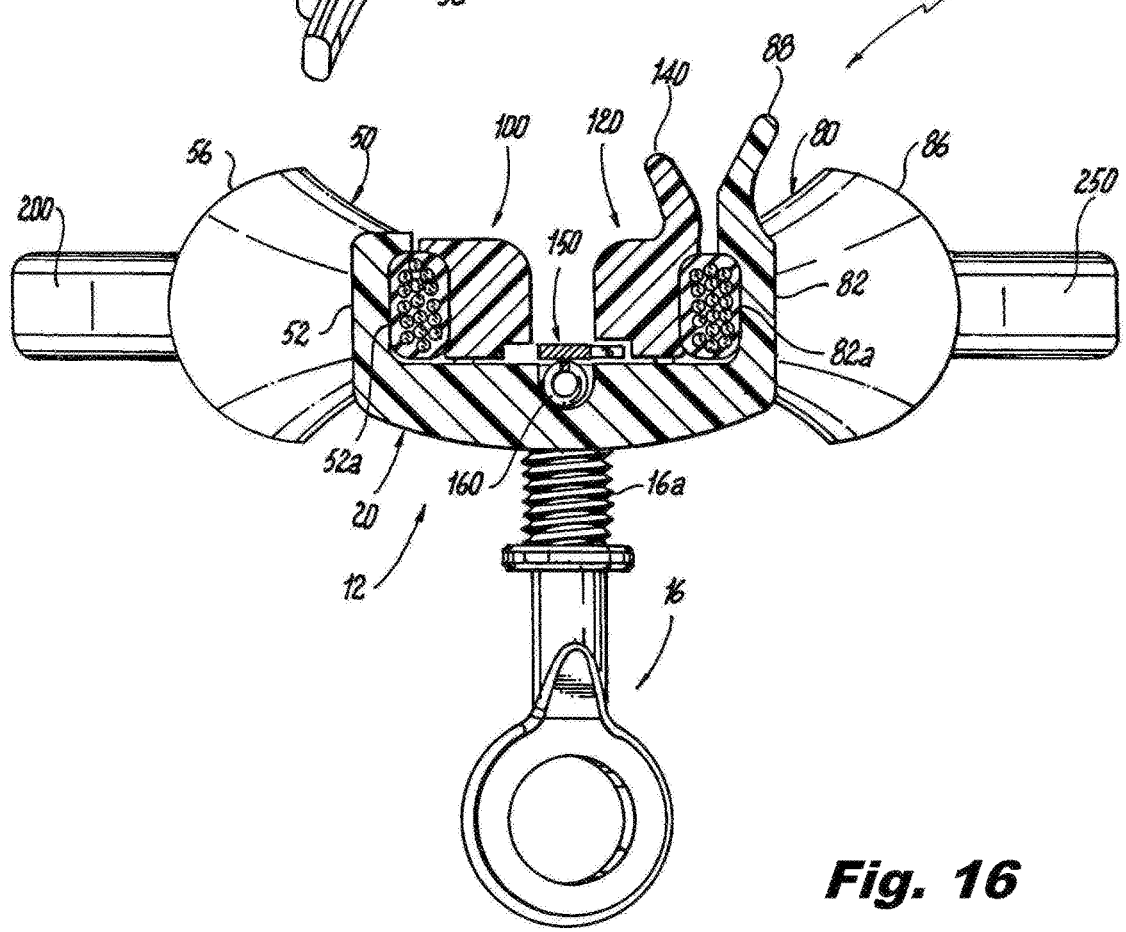
FIG. 16 is a cross sectional view of the cable clamp of FIG. 15 taken along line 16-16 and illustrating the main cable clamped between the main cable jaw and the main cable body of the frame, and the drop cable clamped between the drop cable jaw and the drop cable body of the frame.

Continuing to refer to FIGS. 1-3, the drop cable body 50 is associated with the drop cable side wall 20c of the main body 20. The drop cable body 50 may be formed as a unitary structure or as separate components secured together using fasteners, such as mechanical or adhesive fasteners. Preferably, the drop cable body 50 of the frame 12 is a unitary structure that for general reference purposes has a central portion 52, a first extension portion 54 extending from one end of the central portion 52, and a second extension portion 56 extending from another end of the central portion 52. In this exemplary embodiment, the central portion 52 has an outer wall that is arcuate in shape and includes an inner wall with a cable contacting surface 52a, seen in FIG. 16, that is shaped to receive a drop cable in a vertical orientation. In this exemplary embodiment, the drop cable has an outer sheath that is substantially rectangular with rounded corners, similar to a U-shape, as shown in FIG. 16. An example of such a cable is the RPX self-supporting cable. In this scenario, the cable contacting surface 52a has a flat central region and rounded ends, similar to a U-shape, as shown. A top edge of the central portion 52 of the drop cable body 50 also includes a locking tab 58 used to lock the drop cable jaw 100 in the closed position, as described below.

Turning to the first and second extension portions, in this exemplary embodiment, the first extension portion 54 has an outer wall that is arcuate in shape and conforms to the outer wall of the central portion 52. The inner wall of the first extension portion 54 may have a number of different shapes, such as the same shape as the cable contacting surface 52a of the central portion, an arcuate shape or other shape. An end 54a, seen in FIG. 1, of the first extension portion 54 furthest away from the main body 20 of the frame 12 may have a larger radius than the end of the first extension portion 54 adjacent the central portion 52. The larger radius provides more flexibility for the cable to move at that end 54a and relieves tension on the cable. As a non-limiting example, the larger radius can be in the range of about 0.8 of an inch and greater. Similarly, the second extension 56 has an outer wall that is arcuate in shape and conforms to the outer wall of the central portion 52. The inner wall of the second extension portion 56 may have a number of different shapes, such as the same shape as the cable contacting surface 52a of the central portion 52, an arcuate shape or other shape. An end 56a of the second extension portion 56 furthest away from the main body 20 of the frame 12 may have a larger radius than the end of the first extension portion 54 adjacent the central portion 52. As noted, the larger radius provides more flexibility for the cable to move at that end 56a and relieves tension on the cable. As a non-limiting example, the larger radius can be in the range of about 0.8 of an inch and greater.

Referring to FIG. 2, the dimensions of the drop cable body 50 are sufficient to support a drop cable. As a non-limiting example, the overall length $L_D$ of the drop cable body 50 may range from between about 6 inches and about 15 inches and is preferably about 9 inches. The overall length of the drop cable body 50 may be subdivided by the lengths of the central portion 52, the first extension portion 54 and the second extension portion 56. As a non-limiting example, the length of the central portion 52 may be in the range from about 2 inches to about 6 inches and is preferably about 3 inches. Preferably, the length $L_1$ of the central portion 52 is the same as the length of the drop cable side wall 20c of the main body 20. The length of the first and second extension portions 54 and 56 may be the same or they may differ. For example, the first extension portion 54 has a length $L_2$ that may be in the range from about 2 inches to about 6 inches, and the second extension portion 56 has a length $L_3$ that may be in the range from about 2 inches to about 6 inches.

Non-limiting examples of the dimensions of the first and second extension portions 54 and 56 of the drop cable body 50 will be described. If the length L of the drop cable body 50 is about 9 inches and the length $L_1$ of the central portion 52 is about 3 inches, the length of the first and second extension portions 54 and 56 may both be about 3 inches. If the length L of the drop cable body 50 is about 9 inches and the length $L_1$ of the central portion 52 is about 4 inches, the length $L_2$ of the first extension portion 54 may be about 3 inches and the length $L_3$ of the second extension portion 56 may be about 2 inches.

The drop cable body 50 may be a straight structure, a flared structure, a curved structure, or an irregular shaped structure. In the exemplary embodiment shown in FIGS. 1 and 2, the drop cable body 50 is a flared structure where the central portion 52 is substantially straight and each extension portion 54 and 56 is flared such that a radius of curvature of the flare (represented by the angle "θ" in FIG. 2) of each extension portion is in the range from about 3.5 inches and about 20 inches, and is preferably about 13 inches. As an example, the angle "θ" may be about 6.6 degrees. The flared extension portions 54 and 56 flare the drop cable away from the main cable to decrease the bend strain on the main cable. More specifically, the flared drop cable applies a load on the main cable that is substantially perpendicular to the preferred bend axis of the main cable thus decreasing the bend strain on the main cable.

Continuing to refer to FIGS. 1-3, the main cable body 80 is associated with the main cable side wall 20d of the main body 20. The main cable body 80 may be formed as a unitary structure or as separate components secured together using fasteners, such as mechanical or adhesive fasteners. Preferably, main cable body 80 of the frame 12 is a unitary structure that for general reference purposes has a central portion 82, a first extension portion 84 extending from one end of the central portion 82, and a second extension portion 86 extending from another end of the central portion 82. In this exemplary embodiment, the central portion 82 has an outer wall that is arcuate in shape and includes an inner wall with a cable contacting surface 82a, seen in FIG. 16, that is shaped to receive a main cable in a vertical orientation. In this exemplary embodiment, the main cable has an outer sheath that is substantially rectangular with rounded corners as shown in FIG. 16. An example of such a cable is the RPX self-supporting cable. In this scenario, the cable contacting surface 82a has a flat central region and rounded ends, similar to a U-shape, as shown. A top edge of the central portion 82 of the main cable body 80 also includes a cable guide 88 that is configured and dimensioned to guide a main cable into the main cable body 80 of the frame 12 and to help orient the main cable so that is slides into the main cable body 80 in a vertical orientation.

Turning to the first and second extension portions, in this exemplary embodiment, the first extension portion 84 has an outer wall that is arcuate in shape and conforms to the outer wall of the central portion 82. The inner wall of the first extension portion 84 may have a number of different shapes, such as the same shape as the cable contacting surface 82a of the central portion 82, an arcuate shape or other shape. An end 84a of the first extension portion 84 furthest away from the main body 20 of the frame 12 may have a larger radius than the end of the first extension portion 84 adjacent the central portion 82. The larger radius provides more flexibility for the cable to move at that end 84a and relieves tension on the cable. As a non-limiting example, the larger radius can be in the range of about 0.8 of an inch and greater. Similarly, the second extension 86 has an outer wall that is arcuate in shape and conforms to the outer wall of the central portion 82. The inner wall of the second extension portion 86 may have a number of different shapes, such as the same shape as the cable contacting surface 82a of the central portion 82, an arcuate shape or other shape. An end 86a of the second extension portion 86 furthest away from the main body 20 of the frame 12 may have a larger radius than the end of the first extension portion 84 adjacent the central portion 82. As noted, the larger radius provides more flexibility for the cable to move at that end 86a and relieves tension on the cable. As a non-limiting example, the larger radius can be in the range of about 0.8 of an inch and greater.

Referring to FIG. 2, the dimensions of the main cable body 80 are sufficient to support a main cable. As a non-limiting example, the overall length $L_M$ of the main cable body 80 may range from between about 6 inches and about 15 inches and is preferably about 9 inches. The overall length of the main cable body 80 may be subdivided by the lengths of the central portion 82, the first extension portion 84 and the second extension portion 86. As a non-limiting example, the length of the central portion 82 may be in the range from about 2 inches to about 6 inches and is preferably about 3 inches. Preferably, the length $L_4$ of the central portion 82 is the same as the length of the main cable side wall 20d of the main body 20. The length of the first and second extension portions 84 and 86 may be the same or they may differ. For example, the first extension portion 84 has a length $L_5$ that may be in the range from about 2 inches to about 6 inches, and the second extension portion 86 has a length $L_6$ that may be in the range from about 2 inches to about 6 inches.

Non-limiting examples of the dimensions of the first and second extension portions 84 and 86 of the main cable body 80 will be described. If the length L of the main cable body 80 is about 9 inches and the length $L_4$ of the central portion 82 is about 3 inches, the length of the first and second extension portions 84 and 86 may both be about 3 inches. If the length L of the main cable body 80 is about 9 inches and the length $L_4$ of the central portion 82 is about 4 inches, the length $L_5$ of the first extension portion 84 may be about 2 inches and the length $L_6$ of the second extension portion 86 may be about 3 inches.

The main cable body 80 may be a straight structure, a flared structure, a curved structure, or an irregular shaped structure. In the exemplary embodiment shown in FIGS. 1 and 2, the main cable body 80 is a flared structure where the central portion 82 is substantially straight and each extension portion 84 and 86 is flared such that a radius of curvature of the flare (represented by the angle "β" in FIG. 2) of each extension portion is in the range from about 3.5 inches and about 20 inches, and is preferably about 13 inches. As an example, the angle "β" may be about 6.6 degrees. The flared extension portions 84 and 86 flare the main cable away from the drop cable to decrease the bend strain on the drop cable. More specifically, the flared main cable applies a load on the drop cable that is substantially perpendicular to the preferred bend axis of the drop cable thus decreasing the bend strain on the drop cable.

As is evident from the above, the dimensions of the drop cable body 50 and the main cable body 80 may be the same or they may differ. In the exemplary embodiment shown, the drop cable body 50 has a length $L_D$, seen in FIG. 2, sufficient to support a drop cable, and the main cable body 80 has a length $L_M$ sufficient to support a main cable. In the embodiment shown, the length of each cable body is the same.

Figure 9:
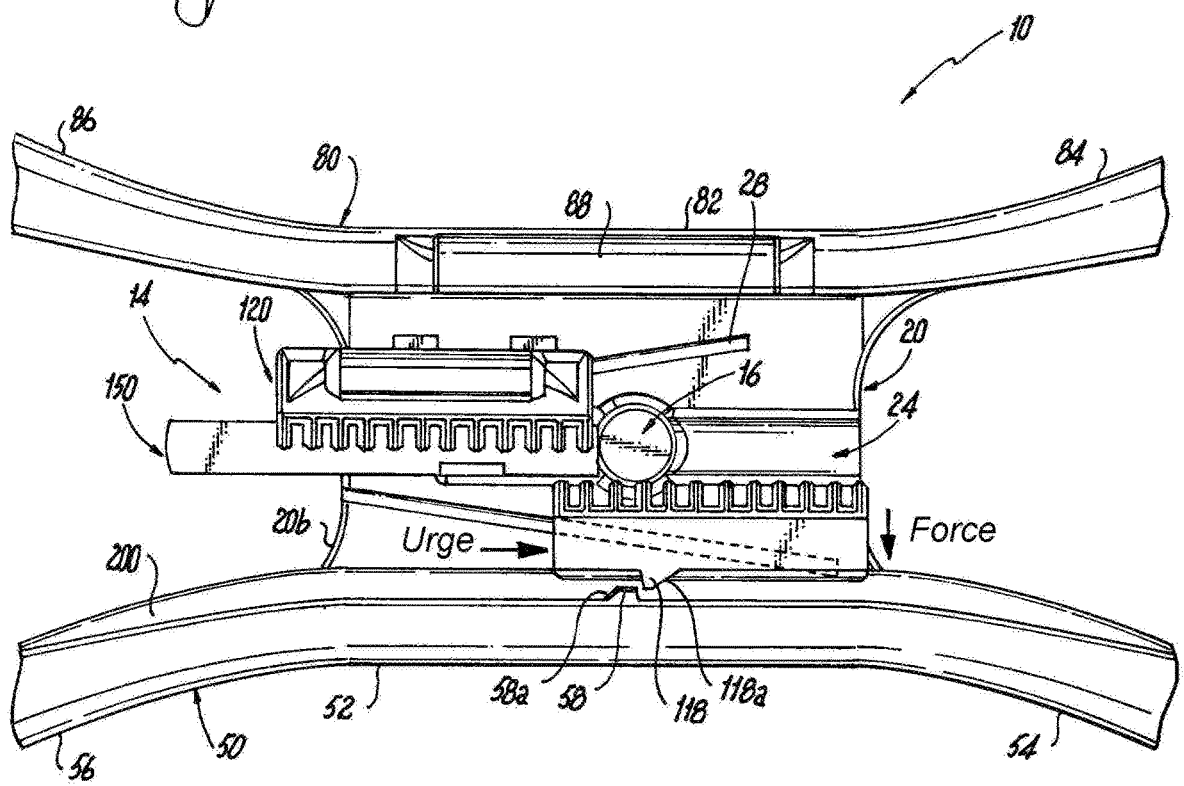
FIG. 9 is a top plan view of the cable clamp of FIG. 8.

Referring now to FIGS. 2-7, an exemplary embodiment of the jaw assembly of the present disclosure will be described. The jaw assembly 14 includes a drop cable jaw 100, a main cable jaw 120, a cable guide 140 and a spring 160. As shown in FIG. 3, the drop cable jaw 100 has a top wall 102, a bottom wall 104, a first end 106, a second end 108, a cable contacting wall 110 and an outer wall 112. Extending from the top wall 102 is a locking tab 118 used to lock the drop cable jaw 100 in a closed position. As seen in FIG. 9, the locking tab 118 has a camming edge 118a that is configured to allow the locking tab 118 to slide along the camming edge 58a of the locking tab 58 extending from the central portion 52 of the drop cable body 50 and past the locking tab 58. When the locking tab 118 of the drop cable jaw 100 is past the locking tab 58 the face of each locking tab contact thus locking the position of the drop cable jaw 100 relative to the central portion 52 of the drop cable body 50. Referring again to FIG. 3, extending from the bottom wall 104 are one or more rails 114 that are configured to ride within the first jaw track 26 of the main body 20. In the exemplary embodiment shown in FIG. 3, there are two rails 114 that are L-shaped rails configured to interlock with the L-shaped first jaw track 26. The rails 114 are aligned on the bottom wall 104 of the drop cable jaw 100 at an angle so that as the drop cable jaw 100 slides along first jaw track 26 substantially all of the cable contacting surface 110a of the cable contacting wall 110 can engage a drop cable positioned within the central portion 52 of the drop cable body 50. The bottom wall 104 may also include a notch 104a, seen in FIG. 7, to permit the drop cable jaw 100 to fit over the slider 150. The cable contacting surface 110a of the cable contacting wall 110 may be a flat surface or the cable contacting surface 110a may include one or more grip enhancing members 116 extending from the surface. The grip enhancing members 116 are provided to engage the sheathing of a drop cable to better grip the cable. As a non-limiting example, the grip enhancing members 116 may be ribs. However, the present disclosure contemplates that the grip enhancing members 116 may include knurling on the cable contacting surface 110a, dimples extending from the cable contacting surface 110a or any other structure or members capable of gripping the sheathing of the drop cable without negatively impacting the integrity of the signals passing through the drop cable. The outer wall 112 of the drop cable jaw 100 may have a flat outer surface or the outer surface may include a plurality of fins 112a, seen in FIG. 2, that help to reduce the material needed to fabricate the drop cable jaw 100. The fins 112a may also lightly engage fins of the main cable jaw to assist in maintaining the jaws in an open position as described below.

Figure 4:
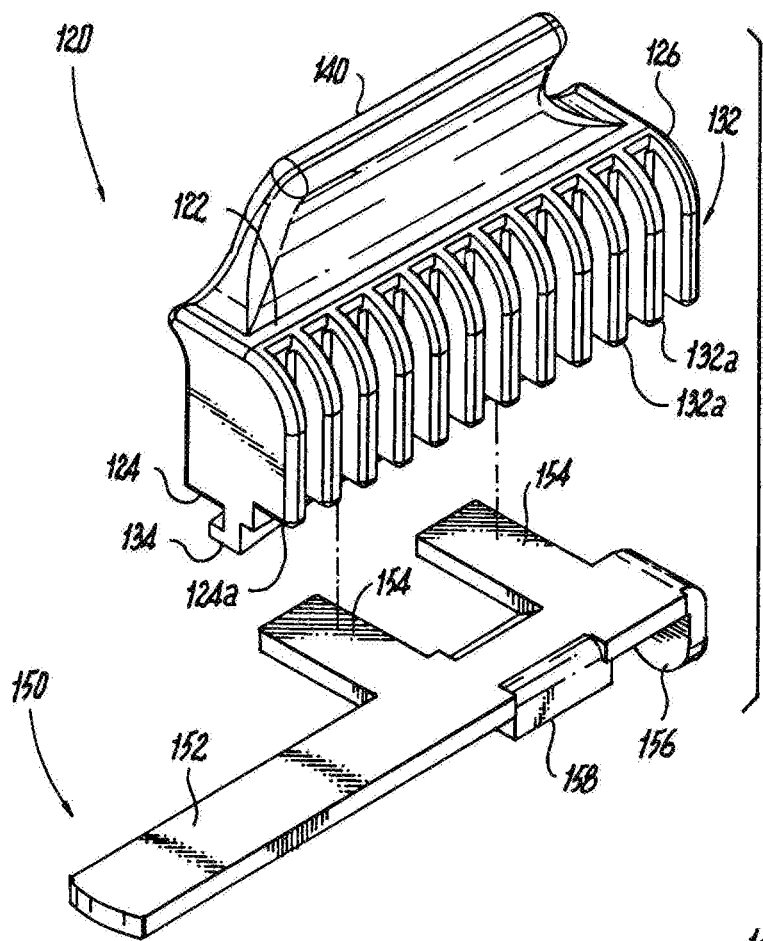
FIG. 4 is a top, perspective view with parts separated from a front of a main cable jaw of the jaw assembly of FIG. 3 and a slider of the jaw assembly.
Figure 5:
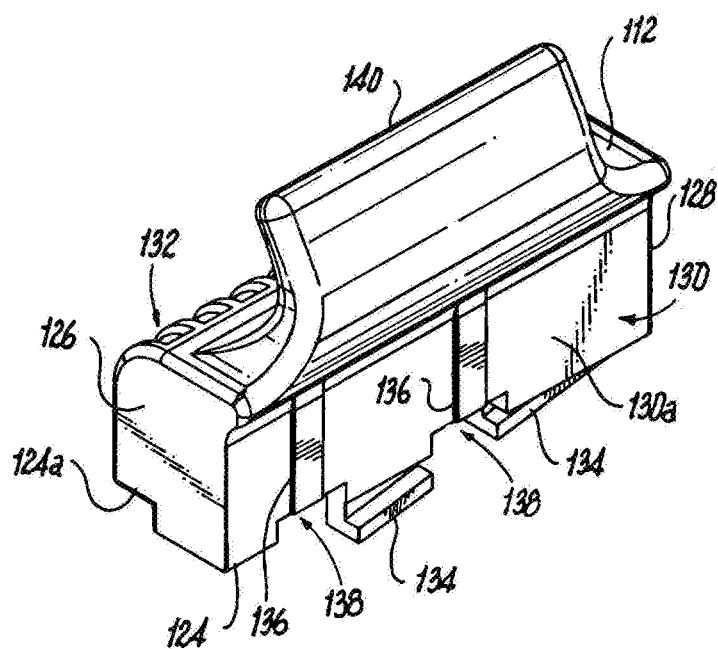
FIG. 5 is a top perspective view from the rear of the main cable jaw of FIG. 4.
Figure 6:
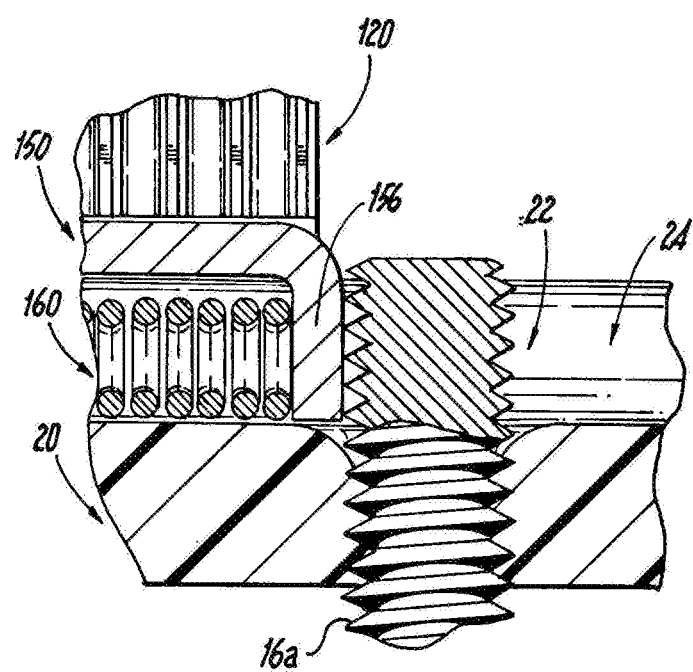
FIG. 6 is a partial cross-sectional view of the cable clamp of FIG. 2 taken along line 6-6 and illustrating a relationship between a stem of the cable clamp passing through the main body of the frame and the jaw assembly.

Referring to FIGS. 3-5, the main cable jaw 120 has a top wall 122, a bottom wall 124, a first end 126, a second end 128, a cable contacting wall 130 and an outer wall 132. Extending from the top wall 122 is a cable guide 140. The cable guide 140 is configured and dimensioned to guide a main cable into the main cable body 80 of the frame 12 and to help orient the main cable so that is slides into the main cable body 80 in a vertical orientation, shown in FIG. 16. Extending from the bottom wall 124 are one or more rails 134 that are configured to ride within the second jaw track 28, seen in FIG. 3, of the main body 20. In the exemplary embodiment shown, there are two rails 134 that are L-shaped rails configured to interlock with the L-shaped second jaw track 28. The rails 134 are aligned on the bottom wall 124 of the main cable jaw 120 at an angle so that as the main cable jaw 120 slides along second jaw track 28 substantially all of a cable contacting surface 130a of the cable contacting wall 130 can engage a main cable positioned within the central portion 82 of the main cable body 80. The bottom wall 124 may also include a notch 124a, seen in FIG. 7, to permit the main cable jaw 120 to fit over the slider 150. The bottom wall 124 includes one or more slots 138 that are configured to receive arms of the cable guide 140 as described below. The cable contacting surface 130a of the cable contacting wall 130 may be a flat surface or the cable contacting surface may include one or more grip enhancing members 136 extending from the surface. The grip enhancing members 136 would engage the sheathing of a main cable to better grip the cable. As a non-limiting example, the grip enhancing members 136 may be ribs. However, the present disclosure contemplates that the grip enhancing members 136 may include knurling on the cable contacting surface 130a, dimples extending from the cable contacting surface 130a or any other structure or members capable of gripping the sheathing of the main cable without negatively impacting the integrity of signals passing through the main cable. The outer wall 132 of the main cable jaw 120 may have a flat outer surface or the outer surface of the outer wall may include a plurality of fins 132a that help to reduce the material needed to fabricate the main cable jaw 120. The fins 132a may also lightly engage fins of the drop cable jaw 100 to assist in maintaining the jaws in an open position as described below.

Figure 7:
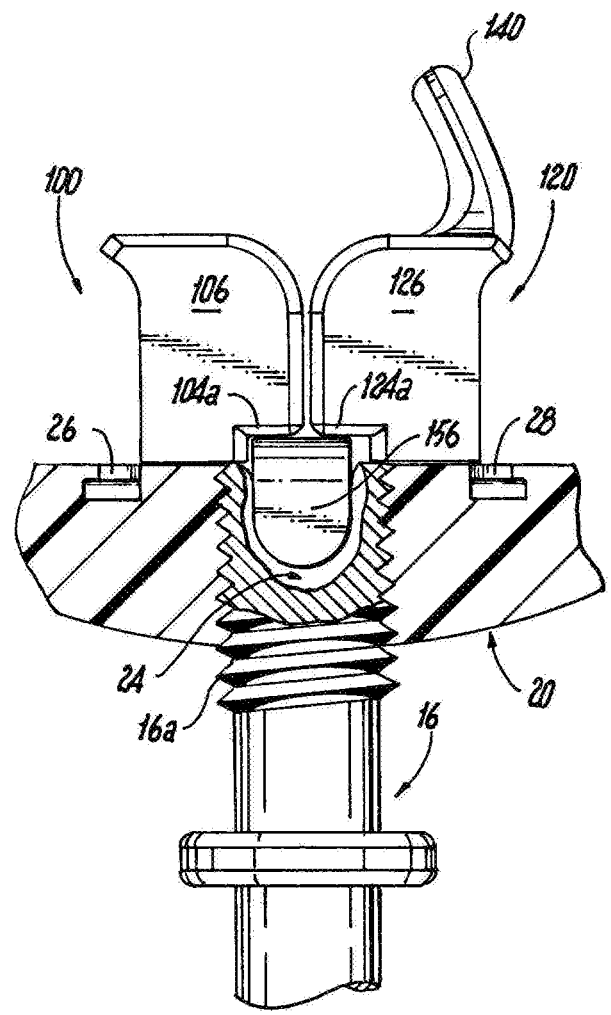
FIG. 7 is a partial cross-sectional view of the cable clamp of FIG. 2 taken along line 7-7 and illustrating the stem partially cut away to reveal a spring stop on the slider of the jaw assembly.

Referring to FIGS. 3 and 4, the slider 150 is configured to interact with the main cable jaw 120 and the spring 160. The slider 150 has an elongated body 152 having a width sufficient to permit the slider 150 to slide along a top surface of the main body 20 of the frame 12. In the exemplary embodiment shown, the body 152 has a width that is greater than the width of the channel 24 in the main body 20 of the frame 12. In another embodiment, main body 20 may include a channel that receives the slider 150 and allows the slider 150 to slide within the channel 24. Extending from the body 152 is one or more arms 154 that are configured to fit within the slots 138 in the main cable jaw 120. The arms 154 mate the main cable jaw 120 to the slider 150 and permit the main cable jaw 120 to slide along the arms 154 as the main cable jaw 120 moves between an open position and a closed position described below. Preferably, the arms 154 are perpendicular to the body 152. However, the present disclosure contemplates that the arms 154 may be at an angle relative to the body 152. Extending from an end of the body 152 that is closer to the arms 154 is a spring stop 156. The spring stop 156 is preferably perpendicular to the body 152 as shown in FIG. 4. The spring stop 156 is configured to fit within the channel 24 in the main body 20 of the frame 12, as shown in FIG. 7, and to slide within the channel 24. Preferably, one end of the spring stop 156 is rounded to conform to the rounded wall of the channel 24. Extending from the body 152 is a stabilizing arm 158 that is configured to fit within the channel 24. In the embodiment shown, the stabilizing arm 158 is positioned between the arms 154 and is provided to maintain the position of the slider 150 relative to the channel 24 as the slider 150 and main cable jaw 120 move between the open and closed positions.

Referring again to FIG. 3, the spring 160 is positioned within the channel 24 in the main body 20 of the frame 12 between a channel wall 24a and the spring stop 156 of the slider 150 as shown. The spring 160 is provided to automatically move the main cable jaw 120 from the open position to the closed position.

Referring to FIGS. 2, 3, 6, 7 and 16, to configure the clamp 10 to receive a drop cable and a main cable the drop cable jaw 100 and the main cable jaw 120 are moved to their open positions. When the drop cable jaw 100 is in the open position, seen in FIG. 2, a drop cable can be positioned between the cable contacting surface 110a of the cable contacting wall 110 of the drop cable jaw 100 and the cable contacting surface 52a of the central portion 52 of the drop cable body 50. When the main cable jaw 120 is in the open position, seen in FIG. 2, a main cable can be positioned between the cable contacting surface 130a, seen in FIG. 5, of the cable contacting wall 130 of the main cable jaw 120 and the cable contacting surface 82a of the central portion 82 of the main cable body 80. The drop cable jaw 100 is manually moved within the first cable track 26 to the open position. Similarly, main cable jaw 120 is manually moved within the second cable track 28 to the open position. When the main cable jaw 120 is moved to the open position, the slider 150 is moved toward the second end wall 20b of the main body 20 of the frame 12 compressing the spring 160 within channel 24 of the main body 20. To maintain the main cable jaw 120 in the open position, the stem 16 is rotated clock-wise further into the aperture 22 of the body 20 until the end 16a of the stem 16 blocks the spring stop 156 within the channel 24 from moving toward the first end wall 20a of the main body 20, as shown in FIGS. 6 and 7. As seen in FIG. 2, with the outer surface 112 of the drop cable jaw 100 and the outer surface 132 of the main cable jaw 120 adjacent to each other in the open position, the fins 112a and 132a, respectively, may mesh with sufficient force to help maintain the drop cable jaw 110 in the open position until a drop cable is positioned between the cable contacting surface 110a of the cable contacting wall 110 of the drop cable jaw 100 and the cable contacting surface 52a of the central portion 52 of the drop cable body 50.

Figure 8:
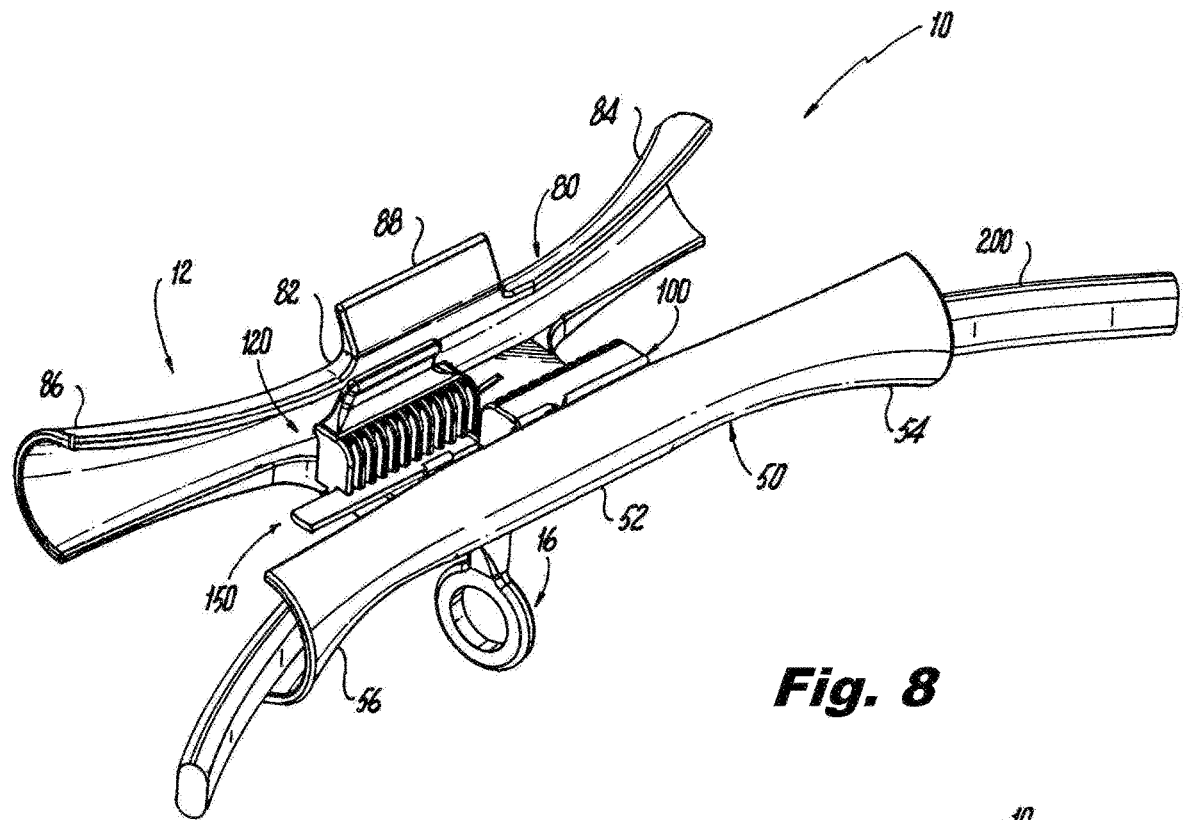
FIG. 8 is a top perspective view of the cable clamp of FIG. 1, illustrating a drop cable within the drop cable body of the frame and a drop cable jaw of the jaw assembly in a closed position securing the drop cable to the drop cable body.

Turning now to FIGS. 8-16, the operation of connecting the cable clamp 10 to a drop cable and a main cable will now be described. Prior to inserting a drop cable or a main cable, the drop cable jaw 100 and the main cable jaw 120 are moved to their open position as described above. With the cable jaws 100 and 120 in the open position a drop cable 200 is positioned between the drop cable jaw 100 and the drop cable body 50 so that the flat part of the cable 200 is in a vertical orientation. In the vertical orientation, the drop cable 200 is aligned to fit between the cable contacting surface 52a of the central portion 52 of the drop cable body 50 and the cable contacting surface 110a of the cable contacting wall 110 of the drop cable jaw 100, seen in FIG. 16. The drop cable jaw 100 is then manually moved from the open position to the closed position. In the closed position, the drop cable 200 is positioned between the cable contacting wall 110 of the drop cable jaw 100 and the cable contacting surface 52a of the central portion 52 of the drop cable body 50. In addition, as the drop cable jaw 100 is moving to the closed position, the locking tab 118 of the drop cable jaw 100 slides past the locking tab 58 in the central portion 52 of the drop cable body 50 locking the drop cable jaw 100 in the closed position relative to the drop cable body 50. By locking the drop cable jaw 100 in the closed position, a force is applied by the drop cable jaw 100 on the drop cable 200 thus clamping or securing the drop cable 200 within the drop cable body 50 of the clamp 10, as seen in FIGS. 8 and 9. It should be noted that the jaw assembly 14 may be configured so that the drop cable jaw 100 is spring loaded or otherwise structured to automatically move from the open position to the closed position.

Figure 10:
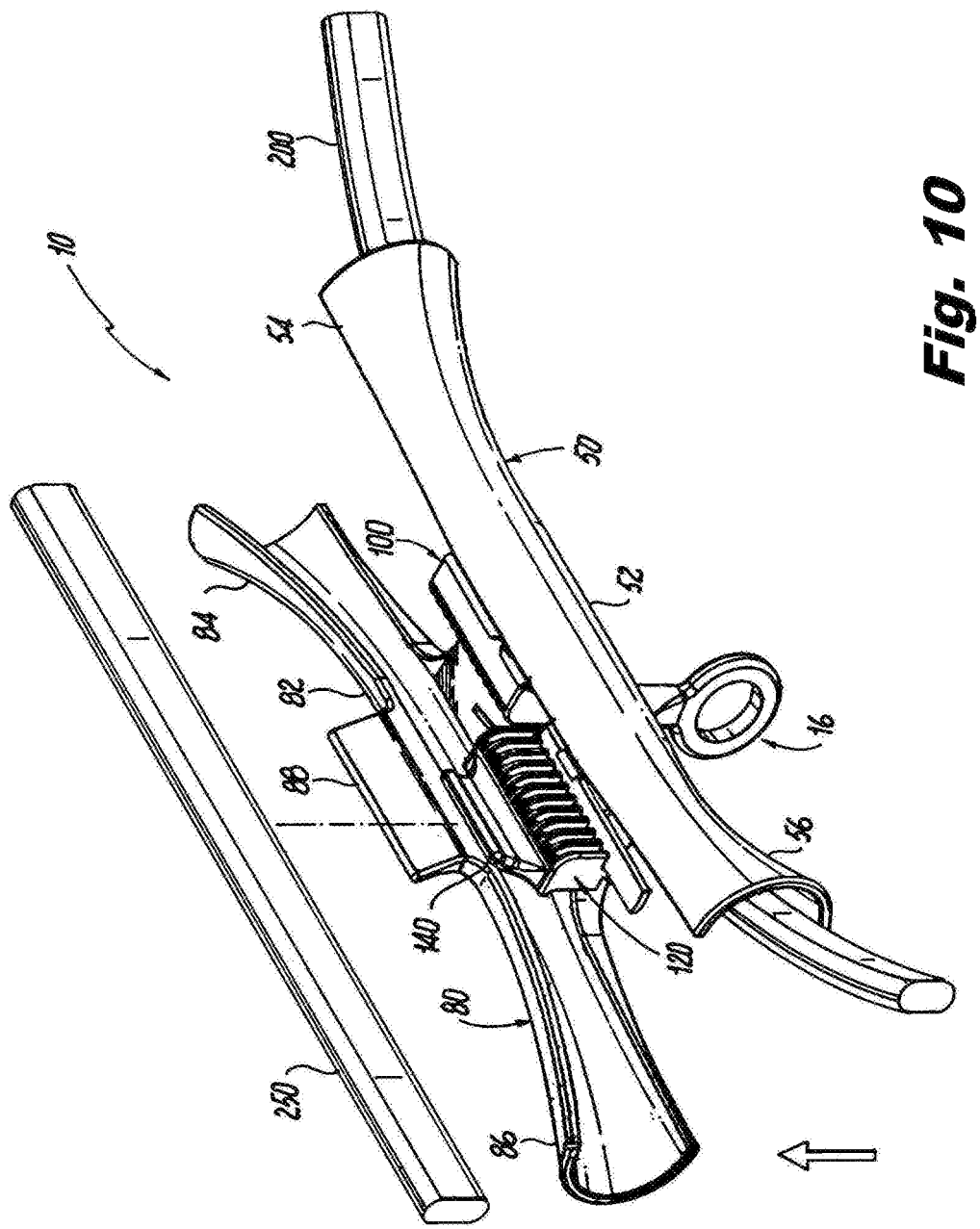
FIG. 10 is a top perspective view of the cable clamp of FIG. 10, illustrating a main cable positioned for insertion within the main cable body of the frame.
Figure 11:
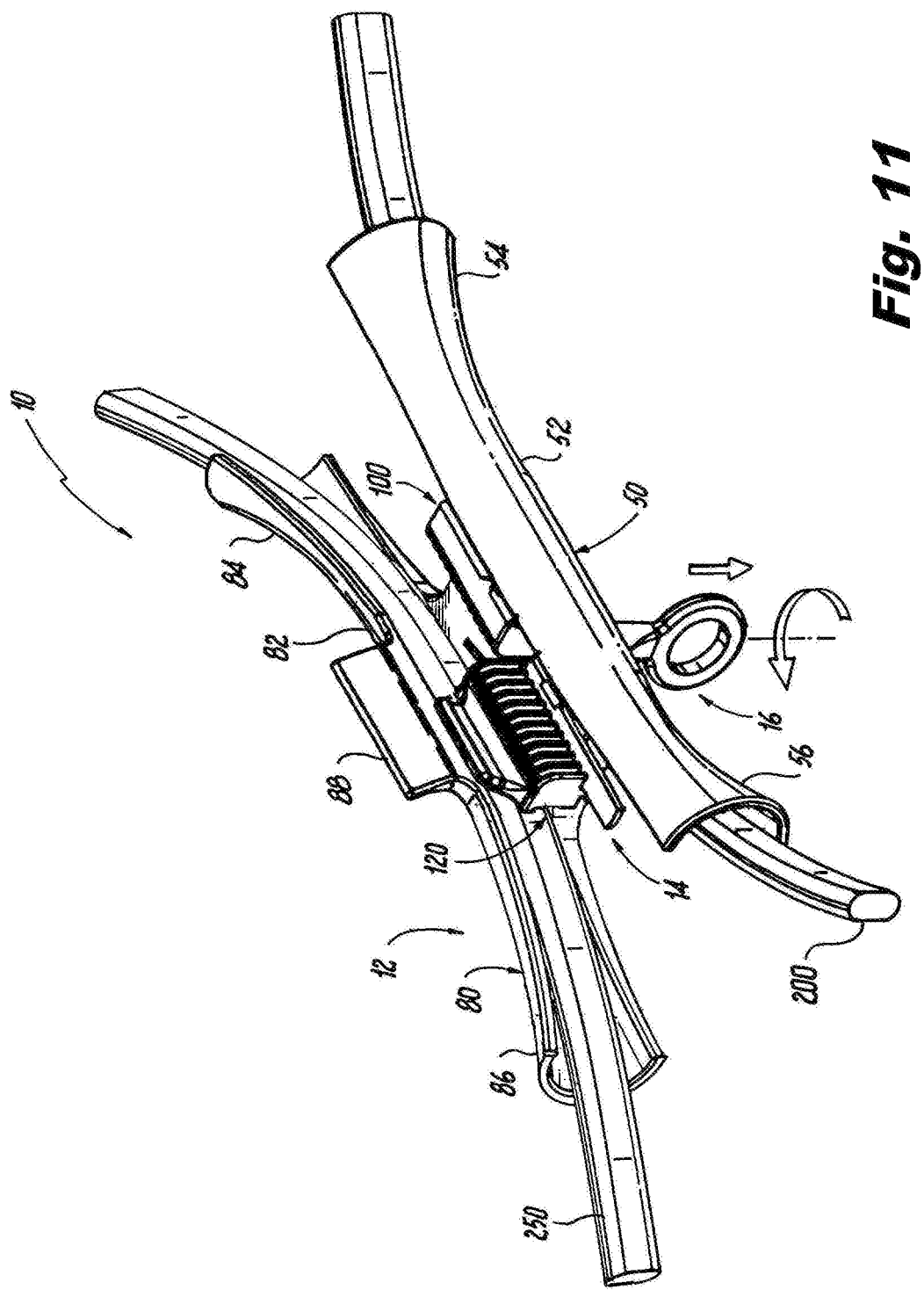
FIG. 11 is a top perspective view of the cable clamp of FIG. 10, illustrating the main cable positioned within the main cable body of the frame with a main cable jaw of the jaw assembly in an open position and prior to release of the main cable jaw.
Figure 12:
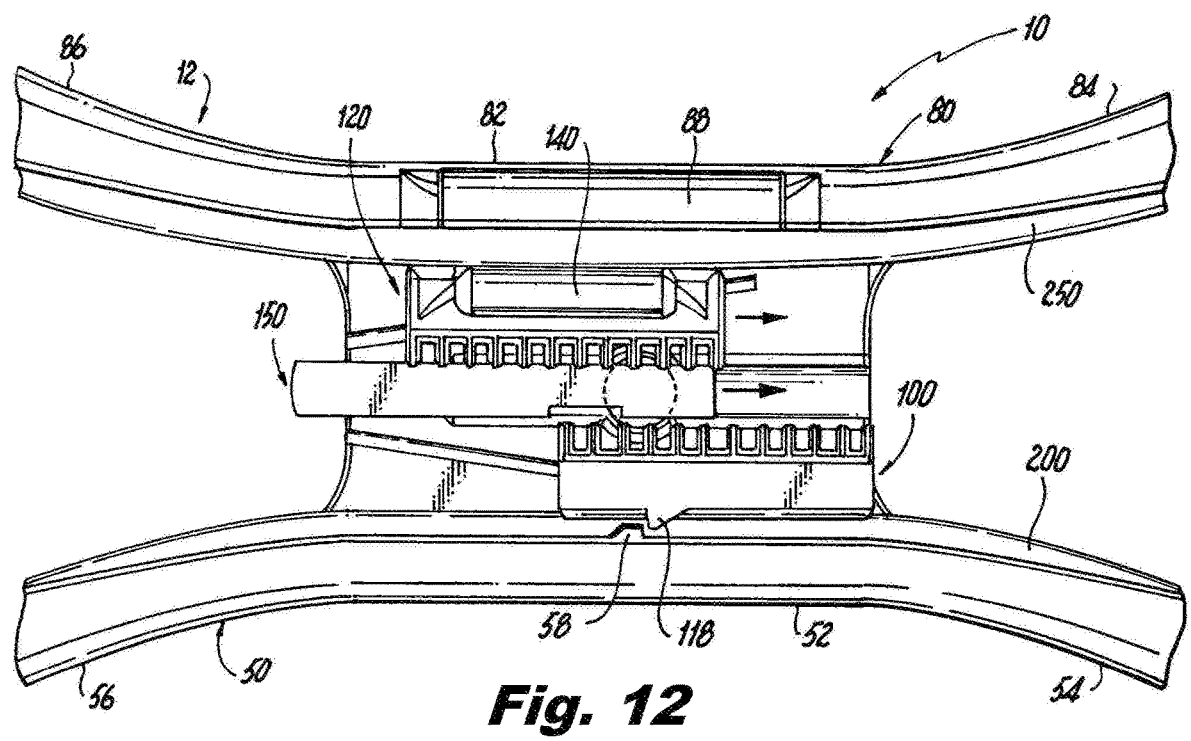
FIG. 12 is top plan view of the cable clamp of FIG. 11 after release of the main cable jaw and showing the main cable jaw moving toward a closed position.
Figure 13:
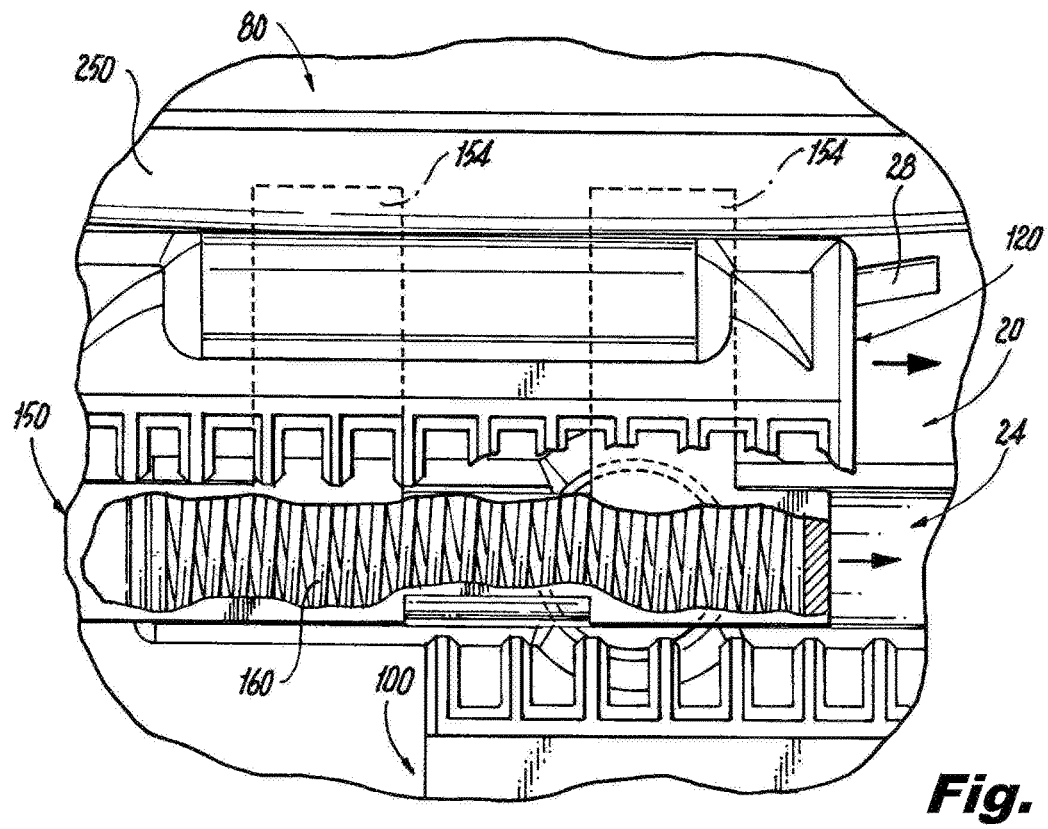
FIG. 13 is a top plan view of a portion of the cable clamp of FIG. 12 with a portion of the frame cut away to reveal a spring of the jaw assembly biasing the slider of the jaw assembly and the main cable jaw toward the closed position.
Figure 14:
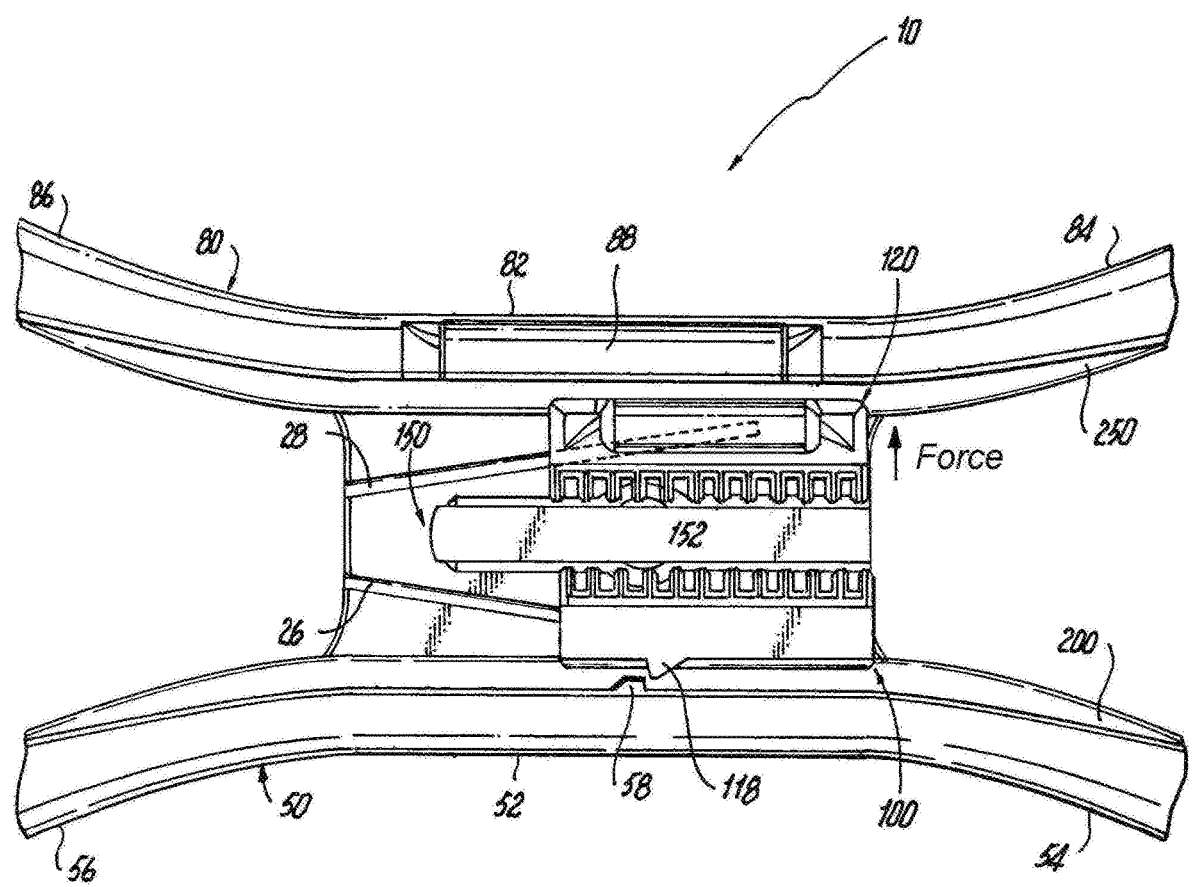
FIG. 14 is top plan view of the cable clamp of FIG. 11 after release of the main cable jaw and showing the main cable jaw in the closed position securing the main cable within the main cable body of the frame, and illustrating the drop cable jaw in the closed position securing the drop cable within the drop cable body of the frame.
Figure 15:
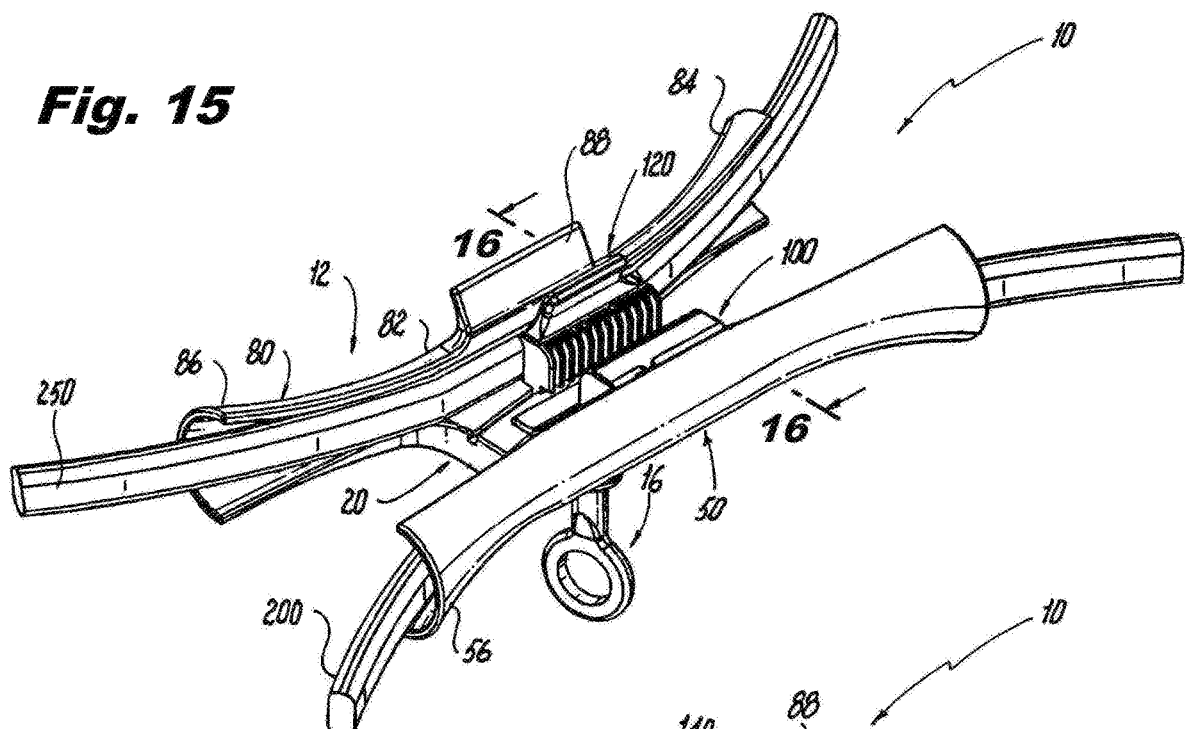
FIG. 15 is a top perspective view of the cable clamp of FIG. 14.

With the drop cable 200 secured to the clamp 10, an extendable reach tool, such as a hot stick, is then attached to the eye 16b of the stem 16 as is known, and the extendable reach tool is elevated toward a main cable 250 extending, for example between two telephone poles, until the main cable 250 is positioned between the main cable jaw 120 and the main cable body 80, as seen in FIGS. 10 and 11. It is noted that the main cable 250 is aligned in a vertical position as shown in FIGS. 10 and 16. If the main cable 250 is not in the vertical position when positioning the main cable 250 between the main cable jaw 120 and the main cable body 80, the cable guide 88 on the main cable body 80 and the cable guide 140 of the main cable jaw 120 guide and cause the main cable 250 to rotate as it is positioned in the main cable body 80 so that the main cable 250 is vertically oriented prior to securing the main cable to the clamp 10. With the main cable 250 positioned between the main cable body 80 and the cable contacting wall 130 of the main cable jaw 120, the stem 16 is rotated counter-clockwise, seen in FIG. 11, to withdraw the end 16a of the stem 16 within the aperture 22 of the main body 20 to a point where the stem no longer blocks the spring stop 156 of the slider 150 thus releasing the slider 150. When the slider 150 is released, the spring 160 moves the slider 150 and the mated main cable jaw 120 to the closed position, as seen in FIGS. 12 and 13, where the main cable 250 is positioned between the cable contacting surface 130a of the cable contacting wall 130 of the main cable jaw 120 and the cable contacting surface 82a of the central portion 82 of the main cable body 80. With the main cable jaw in the closed position, the main cable jaw applies a force against the main cable 250, seen in FIG. 14, to clamp the main cable 250 to the main cable body 80 of the clamp. FIGS. 15 and 16 show a drop cable 200 secured in the drop cable body 50 of the frame 12, and a main cable 250 secured in the main cable body 80 of the frame 12 after installation.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A cable clamp comprising:
   a frame having a main body, a drop cable body and a main cable body, the main body having a top wall and a pair of end walls;
   a jaw assembly operatively coupled to the main body, the jaw assembly having a drop cable jaw and a main cable jaw, wherein the drop cable jaw is movable along the top wall of the main body in a direction toward or away from one of the pair of end walls between an open position permitting a drop cable to be positioned between the drop cable jaw and the drop cable body and a closed position where the drop cable jaw applies a force against the drop cable clamping the drop cable to the drop cable body, wherein the main cable jaw is movable along the top wall of the main body in a direction toward or away from one of the pair of end walls between an open position permitting a main cable to be positioned between the main cable jaw and the main cable body and a closed position where the main cable jaw applies a force against the main cable clamping the main cable to the main cable body, and wherein the main cable jaw is automatically moved from the open position to the closed position; and
   a stem operatively coupled to the main body and the jaw assembly such that the stem can selectively block the main cable jaw in the open position and release the main cable jaw so that the main cable jaw automatically moves to the closed position.

2. The cable clamp according to claim 1, wherein the jaw assembly further comprises:
   a slider coupled to the main cable jaw, the slider having a spring stop extending into a channel of the main body; and
   a spring positioned in the channel between a channel wall and the spring stop, wherein the spring normally biases the main cable jaw toward the main cable jaw closed position.

3. The cable clamp according to claim 1, wherein the drop cable jaw has a cable contacting surface that can contact the drop cable when the drop cable jaw is in the closed position.

4. The cable clamp according to claim 3, wherein the drop cable body comprises a central portion associated with the main body, a first extension portion extending from one end of the central portion and a second extension portion extending from another end of the central portion, wherein the drop cable central portion has a cable contacting surface that can contact the drop cable when the drop cable jaw is in the closed position.

5. The cable clamp according to claim 4, wherein the first extension portion of the drop cable body is flared.

6. The cable clamp according to claim 4, wherein the second extension portion of the drop cable body is flared.

7. The cable clamp according to claim 1, wherein the main cable jaw has a cable contacting surface that can contact the main cable when the main cable jaw is in the closed position.

8. The cable clamp according to claim 7, wherein the main cable body comprises a central portion associated with the main body, a first extension portion extending from one end of the central portion and a second extension portion extending from another end of the central portion, wherein the main cable central portion has a cable contacting surface that can contact the main cable when the main cable jaw is in the closed position.

9. The cable clamp according to claim 8, wherein the first extension portion of the main cable body is flared.

10. The cable clamp according to claim 8, wherein the second extension portion of the main cable body is flared.

11. A cable clamp comprising:
a frame having a main body;
a jaw assembly operatively coupled to the main body, the jaw assembly comprising:
 a drop cable jaw movable along the main body between an open position and a closed position;
 a main cable jaw movable along the main body between an open position and a closed position;
 a slider coupled to the main cable jaw, the slider having a spring stop extending into a channel of the main body; and
 a spring positioned in the channel between the channel wall and the spring stop, wherein the spring normally biases the main cable jaw toward the closed position; and
a stem extending through the aperture in the main body and movable between a position blocking the spring stop and a position releasing the spring stop.

12. The cable clamp according to claim 11, wherein the stem comprises an eye-stem having an eye for releasably connecting the stem to an extendable reach tool.

13. The cable clamp according to claim 11, wherein the slider comprises at least one arm that is coupled to the main cable jaw.

14. The cable clamp according to claim 13, wherein the at least one arm is positioned within at least one corresponding slot in the main cable jaw to couple the slider to the main cable jaw.

15. The cable clamp according to claim 11, wherein when the drop cable jaw is in the open position, a drop cable is capable of being positioned between the drop cable jaw and the drop cable body, and wherein when the drop cable jaw is in the closed position, the drop cable jaw applies a force against the drop cable clamping the drop cable to a drop cable body of the frame.

16. The cable clamp according to claim 15, wherein the drop cable jaw has a cable contacting surface that can contact the drop cable when the drop cable jaw is in the closed position.

17. The cable clamp according to claim 16, wherein the main cable body comprises a central portion associated with the main body, a first extension portion extending from one end of the central portion and a second extension portion extending from another end of the central portion, wherein the main cable central portion has a cable contacting surface that can contact the main cable when the main cable jaw is in the closed position.

18. The cable clamp according to claim 11, wherein when the main cable jaw is in the open position, a main cable is capable of being positioned between the main cable jaw and the main cable body, and wherein when the main cable jaw is in the closed position, the main cable jaw applies a force against the main cable clamping the main cable to a main cable body of the frame.

19. The cable clamp according to claim 18, wherein the main cable jaw has a cable contacting surface that can contact the main cable when the main cable jaw is in the closed position.

20. The cable clamp according to claim 19, wherein the main cable body comprises a central portion associated with the main body, a first extension portion extending from one end of the central portion and a second extension portion extending from another end of the central portion, wherein the main cable central portion has a cable contacting surface that can contact the main cable when the main cable jaw is in the closed position.

* * * * *